Nov. 8, 1955 R. PETROCHKO 2,722,847
PEDAL STRUCTURE FOR AUTOMOTIVE VEHICLES
Filed Aug. 4, 1952 4 Sheets-Sheet 1

INVENTOR
RAYMOND PETROCHKO

BY Cushman, Darby and Cushman
ATTORNEY

Nov. 8, 1955  R. PETROCHKO  2,722,847
PEDAL STRUCTURE FOR AUTOMOTIVE VEHICLES
Filed Aug. 4, 1952  4 Sheets-Sheet 2

INVENTOR
RAYMOND PETROCHKO

BY Cushman, Darby & Cushman

ATTORNEY

Nov. 8, 1955 R. PETROCHKO 2,722,847
PEDAL STRUCTURE FOR AUTOMOTIVE VEHICLES
Filed Aug. 4, 1952 4 Sheets-Sheet 3
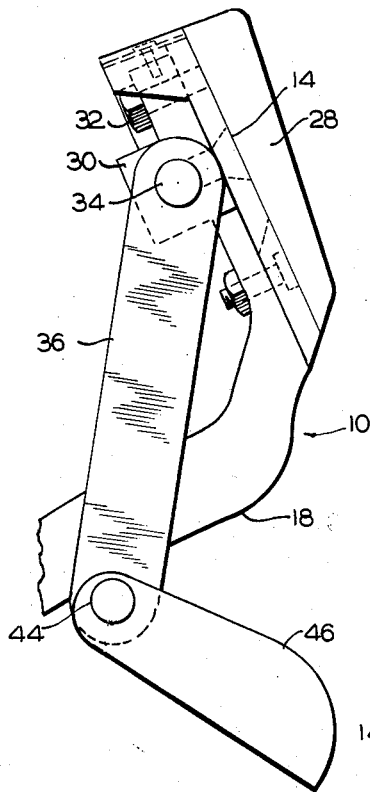
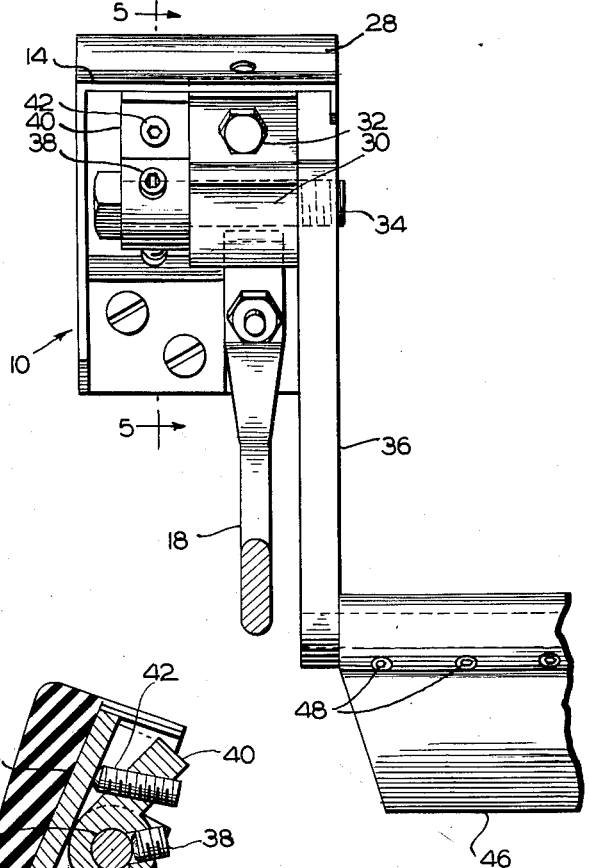
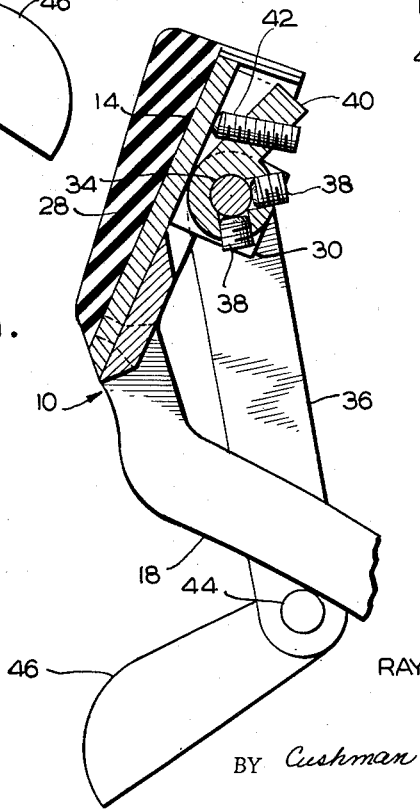
INVENTOR
RAYMOND PETROCHKO
BY Cushman, Darby and Cushman
ATTORNEY Nov. 8, 1955
R. PETROCHKO
2,722,847
PEDAL STRUCTURE FOR AUTOMOTIVE VEHICLES
Filed Aug. 4, 1952
4 Sheets-Sheet 4
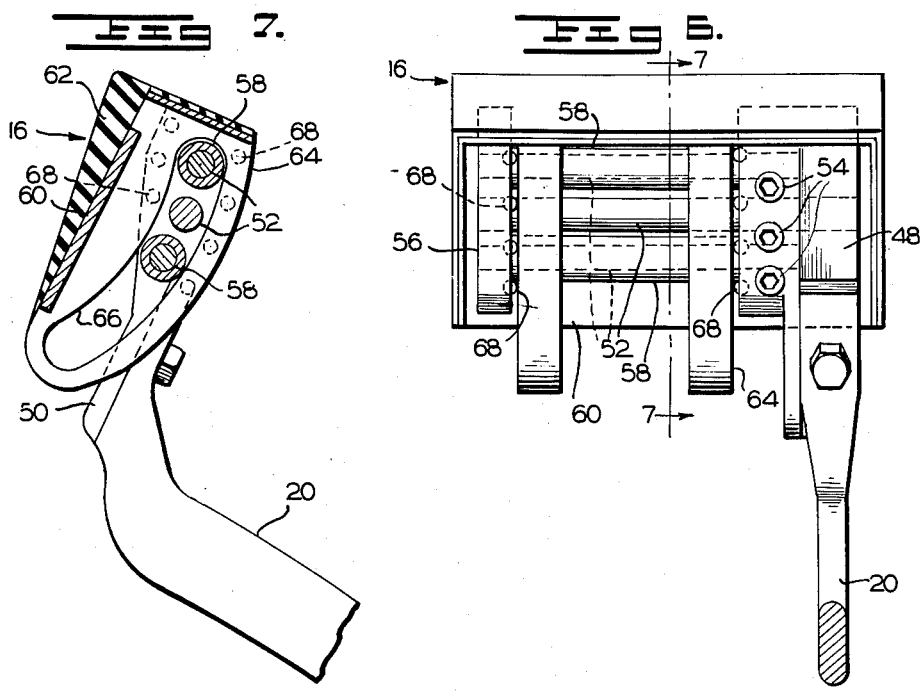
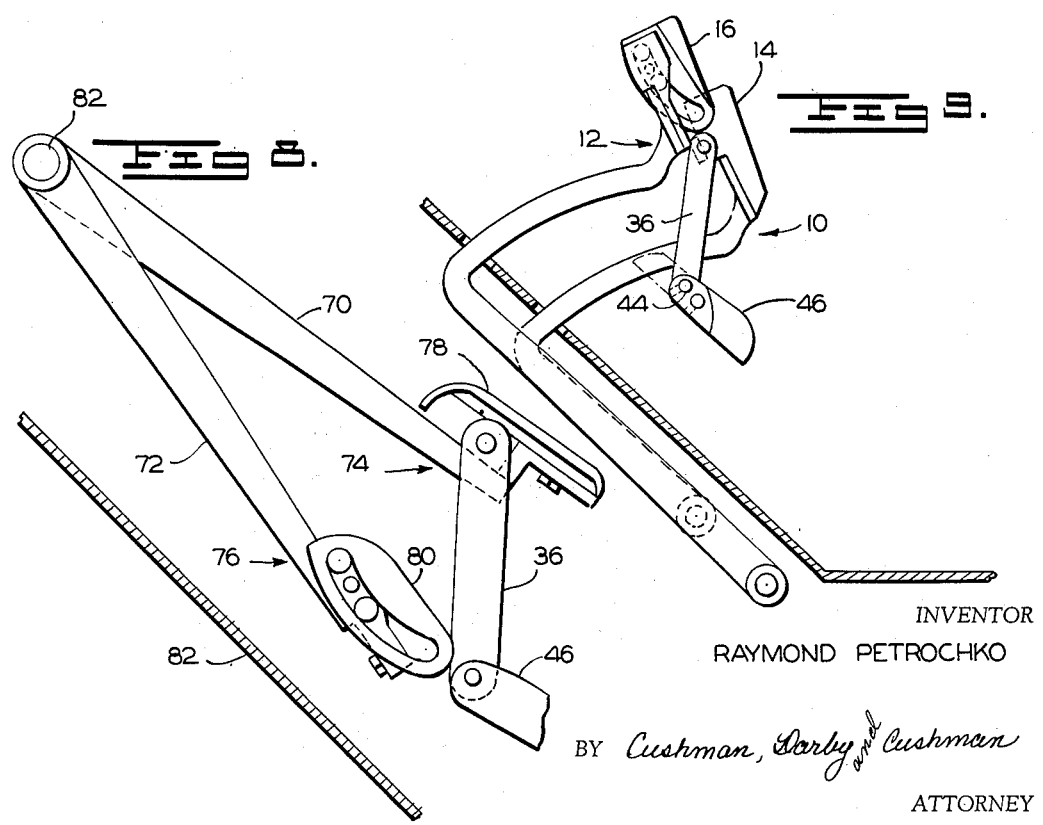
INVENTOR
RAYMOND PETROCHKO
BY Cushman, Darby and Cushman
ATTORNEY United States Patent Office 2,722,847
Patented Nov. 8, 1955

2,722,847
PEDAL STRUCTURE FOR AUTOMOTIVE VEHICLES

Raymond Petrochko, Olyphant, Pa.

Application August 4, 1952, Serial No. 302,475

4 Claims. (Cl. 74—478.5)

This invention relates to pedal structure for automobiles, and more particularly to structure for enabling simultaneous operation of the clutch and brake pedals of a conventional automotive vehicle by a single foot.

Automobiles conventionally are equipped with a clutch and brake pedal arranged side by side with the brake pedal on the right. To the right of the brake pedal is the conventional accelerator pedal. The operator's left foot normally is employed solely for operating the clutch pedal while the right foot is employed for alternate operation of the accelerator and the brake pedals.

In numerous instances it is extremely desirable to be able to control the clutch and the brake simultaneously while the accelerator is under control at the same time. A particular instance where this feature would be desirable is where an automobile is stopped on an up-grade so that in a conventional automobile the vehicle will roll backwards during the interval of shifting the right foot from the brake pedal to the accelerator pedal. This operation engenders a great deal of difficulty, particularly with inexperienced drivers and frequently the engine is stalled or other difficulties arise during the performance of this operation. It is possible to utilize the hand brake lever to hold the car while the operator shifts his foot from the brake pedal to the accelerator pedal, but such use of the hand brake necessitates removing one of the driver's hands from the steering wheel. Such use of both hands and both feet to control an automobile is not only confusing to the operator, but also somewhat distracting and causes his attention to be diverted from surrounding vehicles and traffic.

In still other instances, as for example, wherein an operator has lost his right foot and must, of necessity, use a hand throttle for controlling the speed of the engine, it is desirable to provide pedal structure which will enable simultaneous control of the brake and of the clutch pedals by a single foot.

Therefore, it is an object of this invention to provide a clutch and brake pedal structure for an automotive vehicle which will enable the simultaneous control of both pedals by a single foot.

It is another object of this invention to provide a clutch and brake pedal structure which will enable alternate or simultaneous control of both pedals by a single foot.

It is still another object of this invention to provide a brake and clutch pedal structure which will enable the clutch to be controlled by the toe of a foot while controlling the brake with the heel of the same foot, so that by rocking movements of the foot simultaneous and delicate control of both clutch and brake may be effected.

It is still another object of this invention to provide pedal structure of the type under consideration which will permit of adjustment to accommodate for changes in the length of travel of the brake pedal due to wear of the brake linings.

It is a further object of this invention to provide pedal structure of the type under consideration wherein that portion of the structure engaged by the toe of a foot is mounted for rocking movements to accommodate rocking movements of the foot in simultaneously controlling the brake and the clutch.

Other objects and advantages of the invention will become apparent from the following description and accompanying drawings, in which:

Figure 3 is a fragmentary side elevational view of the brake pedal structure shown in Figure 1.

Figure 4 is a rear elevational view of the brake pedal structure illustrated in Figure 1.

Figure 5 is a sectional view taken on line 5—5 of Figure 4.

Figure 6 is a fragmentary rear elevational view of the clutch pedal illustrated in Figure 1.

Figure 7 is a sectional view taken on line 7—7 of Figure 6.

Figure 8 is a view corresponding to Figure 2 and illustrating an adaptation of this invention to brake and clutch pedals of the type wherein their pivotal axes are located above and to the rear of the footrests of such pedals.

Figure 9 is a view corresponding to Figure 2 and illustrating an adaptation of this invention to clutch and brake pedals having offset pivotal axes.

Figure 1:
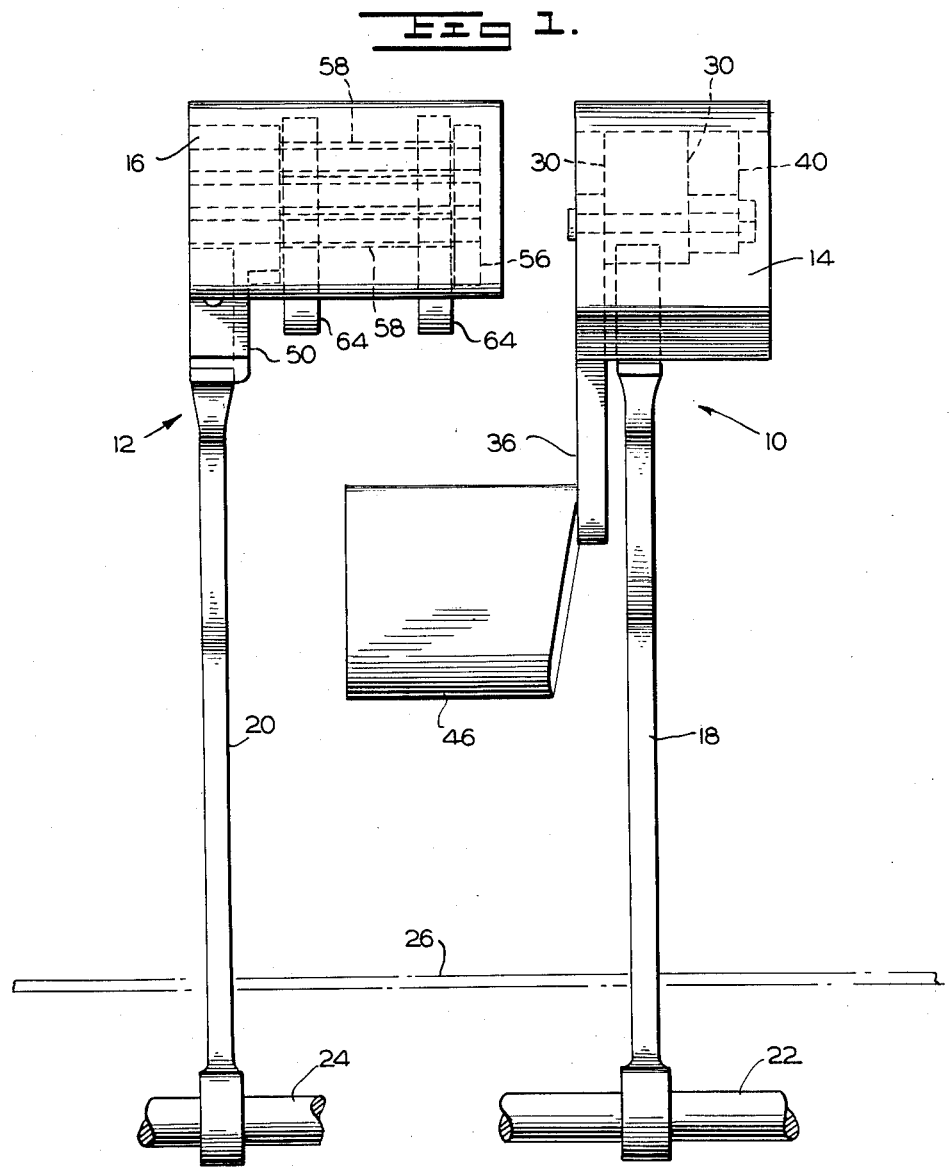
Figure 1 is a front elevational view of a pair of vehicle brake and clutch operating pedals embodying this invention.
Figure 2:
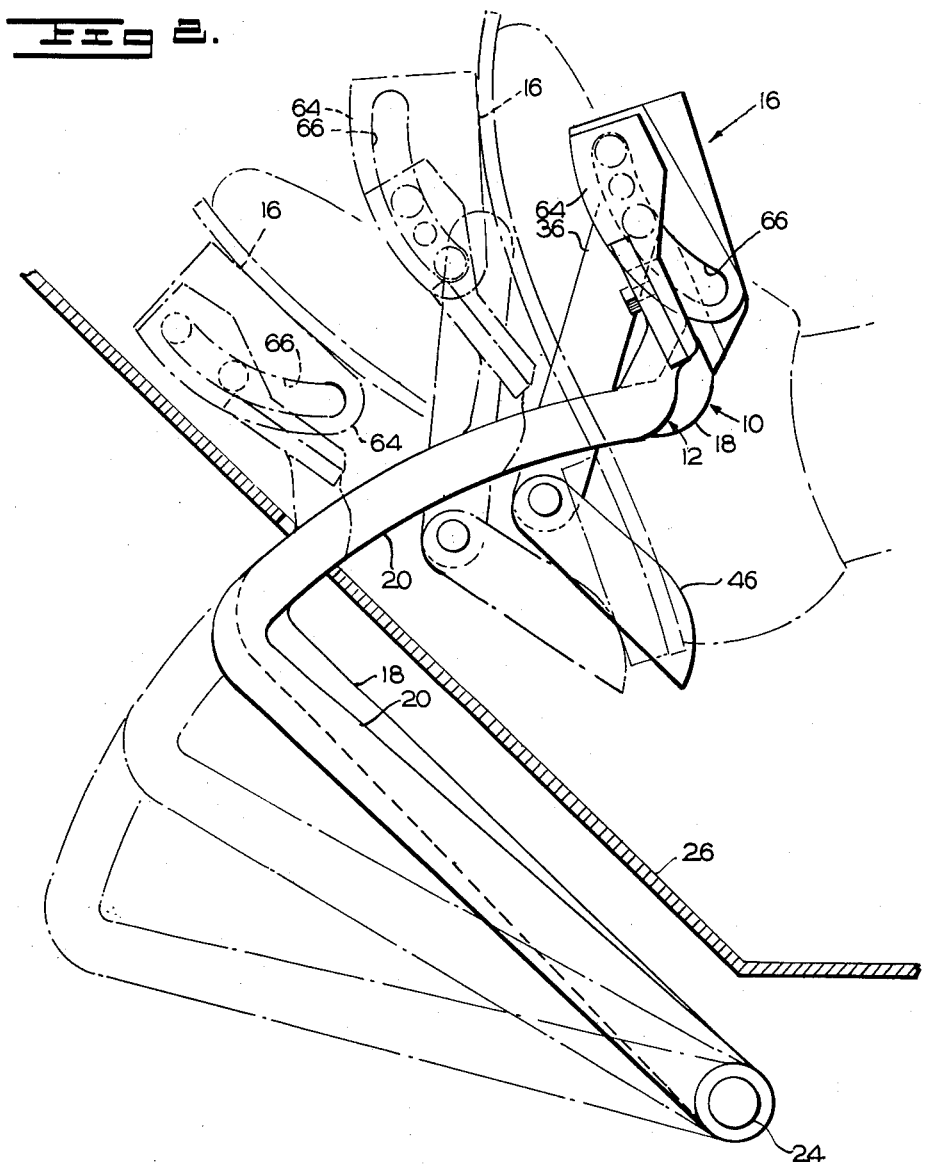
Figure 2 is a side view of the pedals shown in Figure 1 and illustrating the manner of controlling both pedals by a single foot.

Referring now to the drawings, there is shown in Figures 1 and 2 a typical clutch and brake pedal installation in a modern automobile. The brake and clutch pedals 10 and 12, respectively, are located side by side and have extended upper surface areas providing footrests 14 and 16 and depending shank portions 18 and 20 and having right-angled bends therein for attachment to transverse brake and clutch rock shafts 22 and 24, respectively, such shafts being located beneath the floor board 26 of the driver's compartment of an automotive vehicle.

The brake pedal footrest 14, which usually is covered by a rubber or composition cushioning pad 28 (Figure 5), has a bearing lug 30 bolted, as at 32, or otherwise secured to the undersurface thereof. Journalled within the bearing lug 30 is a pivot pin 34 having one end of the arm 36 or a leg fixedly secured to a projecting end of the pin and depending below the footrest 14, as illustrated best in Figures 2 and 3. Adjustably secured to the other projecting end of the pivot pin 34, as by set screws 38, is a radial lug 40 (Figures 4 and 5). Threaded through this lug 40 is an adjustment screw 42, one end of which is adapted to abut against the underside of the footrest 14 to limit angular movement of the leg 36 relative to the footrest. As is best shown in Figures 2 and 3, the screw 42 normally is adjusted so that the depending leg 36 is in the position illustrated in these figures.

The amount of depression of the brake pedal 10 necessary to effect a braking action varies with extended use of an automotive vehicle, i. e., the pedal usually must be depressed further upon wear of the brakes. The screw 42 may be adjusted to vary the angular position of the depending leg 36 in order to compensate for such variation in travel of the brake pedal.

Mounted on a lateral pin 44 affixed to the lower end of the leg 36 is a footrest 46 having an extended surface area for engagement by the heel of an operator's foot, as illustrated best in Figure 2. This footrest 46 extends beneath the footrest portion 16 of the clutch pedal 12, as illustrated best in Figure 1. The clutch pedal footrest 16 is of an improved type and its details will be described more fully hereinafter. The footrest 46 is angularly adjustable on the pin 44 by means of set screws 48.

From this construction it will be seen that an operator's foot may be placed on the clutch footrest 16 and on the leg footrest 46 with the toe resting upon the clutch footrest and the heel resting upon the leg footrest, as illustrated in Figure 2. It is obvious that in this position of an operator's foot, depression of the heel will depress the brake pedal 10 to effect a braking action while depression of the toe will depress the clutch pedal 12 to disengage the clutch. By rocking movements of the operator's foot, the brake and clutch pedals 10 and 12 may be controlled simultaneously to obtain a coordinated and delicate control of these two instrumentalities.

For example, when a vehicle is stopped on an upgrade, the foot will be operated to depress both pedals 10 and 12 simultaneously to thus set the brake and prevent roll-back while maintaining the engine declutched. When the operator desires to set the vehicle in motion, the toe of the left foot is slowly raised while the heel is maintained in depressed position to prevent roll-back. At the same time, the right foot is employed, in the conventional manner, to depress the accelerator pedal (not shown) and speed up the engine of the vehicle. As the clutch slowly becomes engaged, the heel of the left foot is slowly raised to release the brake and enable the engagement of the clutch to impart forward motion to the vehicle. It thus will be seen that by means of the delicate and simultaneous control of the brake and clutch by one foot of an operator while maintaining absolute control over the accelerator pedal with the other foot of the operator, a car may be set in forward motion on an up-grade without roll-back and without danger of choking or stalling the engine by reason of a sudden overload thereon before the engine may be speeded up sufficiently to impart a forward motion, as is usually the case with conventional separately operable clutch and brake pedals.

It will also be seen that by reason of this construction an automobile may be brought to a stop by manipulation of the brake and clutch pedals 10 and 12 by a single foot, usually the left foot of an operator. In this procedure, after the accelerator pedal has been released to slow the speed of the engine, the left foot is placed on the clutch pedal footrest 16 and on the leg footrest 46. The drag of the engine is employed in a conventional manner to slow the forward motion of the vehicle while the brake pedal 10 is slowly being depressed by the heel of the left foot to further retard forward movement of the vehicle. Upon complete heel depression, the brake will set sufficiently to stop the automobile and just prior to this event the toe of the left foot may be depressed to disengage the clutch and prevent stalling of the engine.

Referring particularly to Figures 6 and 7 of the drawings, there are shown the details of the improved type of clutch pedal footrest 16 illustrated in Figures 1 and 2. A bracket 50 is bolted to the top of the shank 20 of the clutch pedal 12 and extending laterally from such bracket are a plurality of parallel rods 52 which may be secured to the bracket by being inserted in a line of holes therein and secured in such holes by set screws 54. The other ends of the rods 52 are tied together by means of a tie bracket 56. Mounted on the end rods of the series are sleeve-like rollers 58. The footrest 16 of the clutch pedal comprises the usual plate-like member 60, which may be covered with a rubber cushioning pad 62, and depending from the underside of such plate-like member is a laterally spaced pair of guide members 64. The guide members 64 are provided with transverse slots 66 that are substantially arcuate in side view and have a radius of curvature with a center located above the upper surface of the footrest 16 (Figures 2 and 7). These slots 66 enclose the rollers 58 to form movable guideways. Each guide member 64 is located closely adjacent the corresponding bracket 48 and tie member 56 and disposed in hemispherical recesses in these latter members are ball bearings 68 which engage against the opposed side surfaces of the guide members 64.

From the aforedescribed construction it will be seen that the footrest 16 of the clutch pedal 12 is mounted for slidable and rockable movement about an axis disposed above the upper surface of the footrest. By means of this construction, and as best illustrated in Figure 2, the flat upper surface of the clutch footrest 16 will be maintained in flat engagement with the toe of an operator's foot during actuation of the clutch pedal 12 by such toe. In other words, the footrest portion 16 of the clutch pedal 12 accommodates itself to rocking movements of the operator's toe and maintains effective engagement with such toe without undue strain on the part of the operator.

Referring now to Figure 8 of the drawings, a construction is shown therein wherein the shanks 70 and 72 of the brake and clutch pedals 74 and 76, respectively, extend upwardly and forwardly from their footrest portions 78 and 80 for attachment to transverse clutch and brake rock shafts 82 located above the floor board of an automotive vehicle and beneath the usual dashboard (not shown) of the same. In this type of construction the leg 36 and footrest 46 may be connected to the brake pedal 74, adjacent its footrest portion 78, in substantially the same manner as the attachment illustrated in Figure 1. The clutch footrest 80 is slidably and rockably attached to the clutch pedal 76, also in substantially the same manner as illustrated in Figures 6 and 7.

Referring now to Figure 9, there is illustrated a modified form of brake pedal attachment for use wherein the transverse brake and clutch pedal rock shafts 22 and 24 are offset laterally so that the footrest portions 14 and 16 of the brake and clutch pedals 10 and 12 are offset in the same direction. In this construction the footrest 46, attached to the lower end of the leg 36, is provided with two or more longitudinally offset holes 84 for receiving the pin 44, so that, as illustrated in dotted lines in this figure, the footrest 46 may be moved forwardly so that it is in an operative position beneath the footrest portion 16 of the clutch pedal 12.

It will thus be seen that the objects of this invention have been effectively accomplished. It will be realized, however, that the specific embodiments disclosed for the purpose of illustrating the principles of this invention are subject to modification without departing from such principles. Therefore, this invention includes all modifications encompassed within the spirit and scope of the following claims.

I claim:

1. In an automotive vehicle having adjacent clutch and brake pedals each having a shank and a footrest normally spaced above a floorboard for depression theretoward, the combination comprising: a leg secured to the brake pedal adjacent its footrest and depending therebelow; a lateral footrest on said leg extending beneath the clutch pedal footrest for simultaneous engagement of said leg and the clutch footrests by the heel and toe, respectively, of one foot of an operator; and means mounting the clutch pedal footrest for rocking movement on the clutch pedal shank about an axis normal to the plane of movement of the clutch pedal and spaced in front of the clutch pedal footrest.

2. The structure defined in claim 1 in which the clutch pedal footrest mounting means includes: a pair of parallel rods extending laterally from the top of the clutch pedal shank thereof; rollers on said rods; and laterally-spaced lugs depending from the clutch pedal footrest and having curved slots therein enclosing said rollers.

3. In an automotive vehicle having adjacent clutch and brake pedals each having a footrest and a shank the combination comprising: a leg having one end thereof pivotally secured to the brake pedal adjacent its footrest to depend therebelow; adjustable stop means to limit forward pivotal movement of said leg; a lateral footrest secured to the other end of said leg and extending beneath the footrest on the clutch pedal; and means mounting the footrest on the clutch pedal for slidable rocking movement about an axis in front of the last-mentioned footrest and normal to the plane of movement of the clutch pedal.

4. The structure defined in claim 3 in which the leg footrest is mounted on the leg for angular adjustment about an axis normal to the plane of movement of the brake pedal.

References Cited in the file of this patent

UNITED STATES PATENTS

| 1,429,108 | Schraumburger et al. | Sept. 12, 1922 |
| 1,584,712 | Bailey et al. | May 18, 1926 |
| 1,629,381 | Hill | May 17, 1927 |
| 2,078,324 | Griffiths | Apr. 27, 1937 |
| 2,600,267 | Ruscito | June 10, 1952 |
| 2,628,507 | Juergens | Feb. 17, 1953 |